Figure 1:
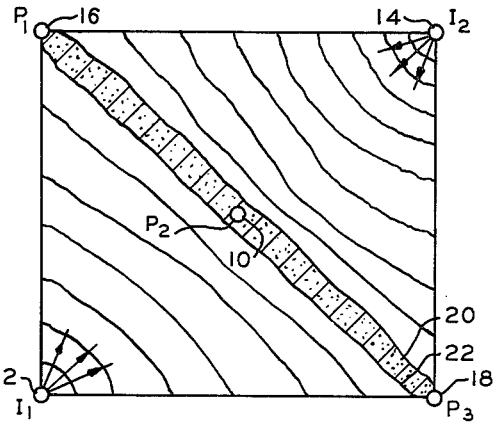

Aug. 10, 1965  M. SANTOURIAN  3,199,587
RECOVERY OF OIL BY IMPROVED FLUID DRIVE
Filed Sept. 10, 1962  2 Sheets-Sheet 1

INVENTOR.
MELCON SANTOURIAN
BY Hudson & Young
ATTORNEYS

Aug. 10, 1965   M. SANTOURIAN   3,199,587
RECOVERY OF OIL BY IMPROVED FLUID DRIVE
Filed Sept. 10, 1962   2 Sheets-Sheet 2

INVENTOR.
MELCON SANTOURIAN
BY *Young & Quigg*
ATTORNEYS

United States Patent Office

3,199,587
Patented Aug. 10, 1965

3,199,587
RECOVERY OF OIL BY IMPROVED
FLUID DRIVE
Melcon Santourian, Bartlesville, Okla., assignor to Phillips Petroleum Company, a corporation of Delaware
Filed Sept. 10, 1962, Ser. No. 223,298
16 Claims. (Cl. 166—9)

This application is a continuation-in-part of my application Serial No. 117,317, filed June 15, 1961, now abandoned.

This invention is concerned with an improved process for recovering hydrocarbons from an oil-bearing stratum by fluid drive. A specific aspect of the invention relates to an improved flood pattern for increasing flooding efficiency in producing oil using a well pattern having an even number (at least 4) of wells surrounding a central well.

Conventional five-spot, seven-spot, and nine-spot well arrangements are commonly accepted well patterns in the oil industry for producing hydrocarbons by flooding or fluid drive and by in situ combustion. The operators choose one of the conventional arrangements utilizing the surrounding wells as injection wells and the center well as a producing well, or the inverted arrangement wherein the central well is used as an injection well and the surrounding wells as producers. With this conventional procedure, sweep of the whole well pattern is not feasible and sweep efficiency is lower than desirable.

This invention is directed to an improved flooding pattern for use in conventional well arrangements for producing hydrocarbons from an oil bearing stratum with a displacing fluid.

Accordingly, it is an object of the invention to provide an improved process for recovering oil from a subterranean oil-bearing stratum. It is also an object of this invention to provide a novel fluid drive process which is more efficient than conventional methods. Another object is to provide a novel and improved flow pattern for use in five-spot, seven-spot, nine-spot, etc. well patterns. Other objects of the invention will become apparent upon consideration of the accompanying disclosure.

A broad aspect of the invention, as applied to any well pattern having a central well surrounded by an even number (at least 4) of wells comprises injecting driving fluid thru alternate surrounding wells (sometimes designated wells in the ring) and utilizing the center well and the other surrounding wells as producing wells, maintaining back pressure on the producing wells, and controlling the back pressure on said wells so as to reach breakthru of displacing fluid on the producing wells substantially at the same time. A further aspect of the invention comprises converting the central well to an injection well at breakthru while continuing to produce thru the other original production wells.

Factors which comprise the horizontal sweep efficiency are (1) mobility ratio (2) permeability variations in the reservoir rock, (3) viscous fingering, (4) well pattern, (5) fracture size, orientation, and spacing, (6) production scheduling, and (7) width of the miscible zone. The horizontal sweep efficiency is one of the variables which controls the degree of oil recovery from the petroleum reservoir by a frontal-drive type process. The Oil Industry is faced with an ever increasing cost of finding new oil reservoirs. This, coupled with the fact that conventional methods of oil recovery usually leave from 1 to 3 barrels of oil in the ground for every barrel produced, has aroused considerable interest in developing more efficient oil recovery methods. Hence, the need for more efficient secondary and tertiary recovery techniques is apparent.

Laboratory studies have demonstrated that in a simulated miscible displacement type oil recovery for a mobility ratio of unity, and under ideal conditions, the pattern efficiency for the conventional or inverted five-spot pattern is about 71% at breakthru of displacing fluid into the production well. I have found that injecting thru two opposite corner wells in a five-spot pattern and producing thru the other three wells (in line) and producing about twice as fast at the corner wells as at the center well by controlling the back pressure on the producing wells, results in a pattern efficiency substantially greater than 71% at break thru with a mobility ratio of 1, and moreover, the amount of oil produced at the breakthru is more than is produced by conventional methods. The technique of the invention effects similar advantages when applied to seven, nine-spot, and similar patterns.

Figure 2:
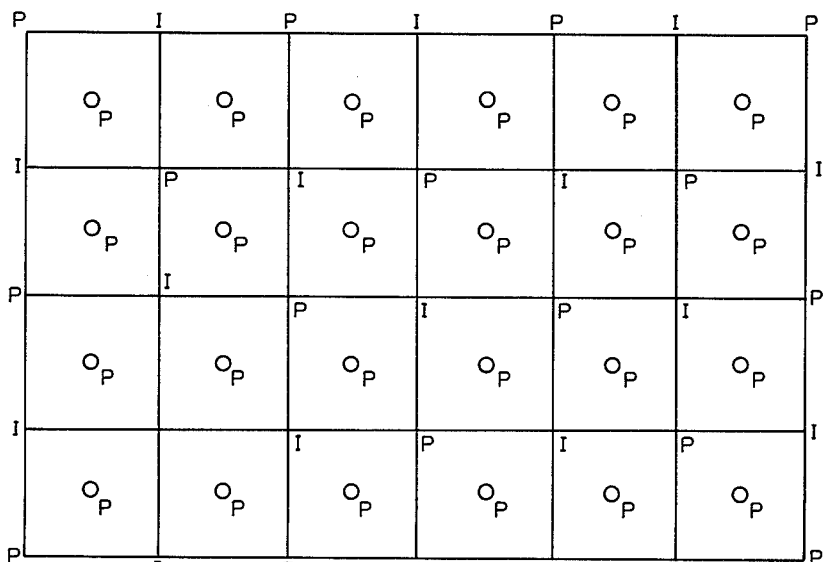
Figure 3:
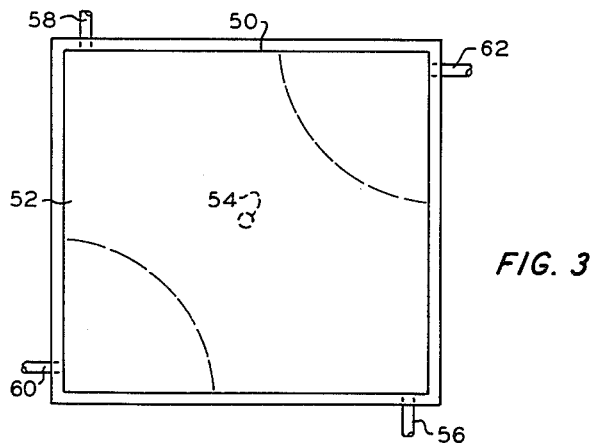
Figure 4:
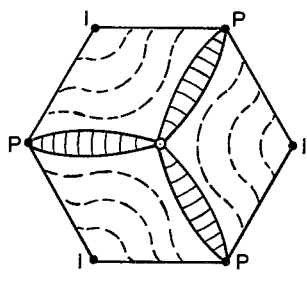
Figure 5:
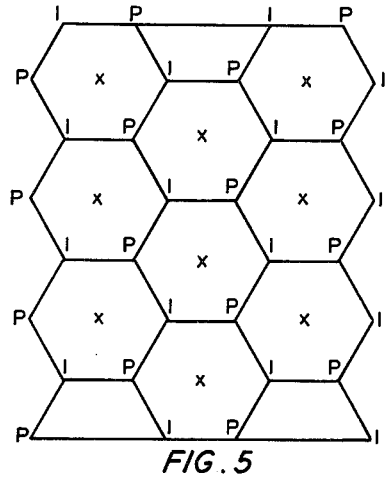
Figure 6:
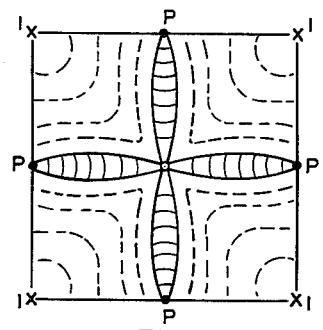
Figure 7:
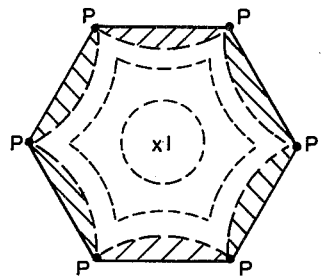

In order to provide a more complete understanding of the invention, reference is made to the schematic drawing, of which FIGURE 1 is a plan view of a five-spot pattern showing the fluid drive pattern of the invention; FIGURE 2 is a plot of a field showing a preferred procedure for applying the fluid drive pattern of the invention; FIGURE 3 is a plan view of laboratory apparatus utilized in simulating the process of the invention; FIGURE 4 is a plan view of a seven-spot pattern showing the fluid drive pattern of the invention; FIGURE 5 is a plot of a field showing a procedure for applying the fluid drive pattern of FIGURE 4; FIGURE 6 is a plan view of a nine-spot pattern showing the fluid drive technique of the invention; and FIGURE 7 is a plan view of a seven-spot well pattern utilizing a conventional fluid drive pattern.

Referring to FIGURE 1 a central well 10 is surrounded by a ring of wells 12, 14, 16, and 18 which forms a square with well 10 substantially at the intersection of the diagonals of the square. Operation in accordance with the invention involves injecting displacing fluid thru wells 12 and 14 under substantial pressure and producing thru wells 10, 16, and 18 against back pressure so that by maintaining greater back pressure on well 10 than on wells 16 and 18, break thru of displacing fluid into the producing wells occurs substantially simultaneously. At one stage, the concentration of oil is illustrated by the shaded area between lines 20 and 22. The arrows around wells 12 and 14 indicate the direction of movement of injected fluid. At break thru it is preferable to convert central well 10 to an injection well so as to force the oil in the shaded area between lines 20 and 22 into producing wells 16 and 18, thereby substantially completely denuding the stratum within the well pattern. The injection wells 12 and 14 may be continued as injection wells at the same injection rate or at cut back injection rates or these wells may be simply shut-in, depending upon the character of the formation.

FIGURE 2 illustrates the application of the well pattern of FIGURE 1 to an oil field. In each pattern, two corner wells serve as injection wells (I) and the central well and the two opposite corner wells serve as production wells (P). The whole field or any section thereof can be produced, simultaneously, with the same injection and production wells.

FIGURE 3 is a diagrammatic plan view of a laboratory device for simulating fluid drive. The apparatus comprises a box 50 having transparent glass plate 52 sealed to the box at the edges with an aluminum plate 1/16" below the top glass plate and similarly sealed to box 50. The space between the plates is filled with 70 to 80 mesh glass beads. A center outlet tube 54 thru the lower plate serves as a central producing well while tubes 56 and 58 serve as corner producing wells. Tubes 60 and 62 serve as injection wells. All of the tubes are 1/16" I.D. and connect with the space between the plates. The box is 15" square.

The flow pattern illustrated in FIGURE 4 involves injecting the driving fluid thru alternate wells in the ring and utilizing the other wells in the ring as well as producing wells. The dashed lines illustrate the sweep of the driving fluid at different stages of the process and the solid line indicate the sweep pattern after break thru has been reached and the central well has been converted to an injection well.

FIGURE 5 illustrates the application of the flow pattern of FIGURE 4 to an oil field.

FIGURE 6 illustrates the flow technique of the invention applied to a nine-spot well pattern. Here, alternate surrounding wells are utilized as injection wells and the other surrounding or ring wells are utilized as production wells along with the center well. The dashed lines and the solid lines in this figure represent the flow pattern before and after the central well has been converted to an injection well.

FIGURE 7 illustrative of the incomplete sweep of the driving fluid in the well pattern when utilizing conventional inection techniques wherein the central well functions as an injection well with production being effected thru each of the wells in the ring. The shaded areas along the borders of the pattern represent areas not swept by the driving fluid.

The data presented in the table below were obtained with the apparatus shown in FIGURE 3 and described herein. The pore or void space between the beads was filled with simulated oil (glycerin and water) artificially colored red and the displacing fluid was water artificially colored green so that the progress of the displacement could be readily visualized. The viscosity at 75° F. for the oil was 9.3 cps. (centipoises), while that of the displacing fluid was 0.93 cps. so that the mobility ratio was 10.0. The calculated pore volume (P.V.) was 106.6 cc. and the measured P.V. was 103.0 cc. The injection rate was 40 cc. per hour thru tubes 60 and 62, tubes 54, 56, and 58 being utilized to withdraw the produced oil.

In run 216, the production rate thru the corner wells was controlled at about twice the rate of production thru central well 54. In Run No. 217 the two corner wells were open up to production at the start and after injection of about 57.5 cc. of displacing fluid, the center well was opened up and all three wells were produced at substantially equal rates. In Run 218, all three wells were opened up simultaneously to production. In Run No. 219, the center well was produced until break thru and then the two corner wells were opened up and equal production rates were maintained in all three wells. In Run No. 220, the center well was produced, alone, until 1.0 pore volume (103.0 cc.) had been injected at which time the two corner wells were opened up to production, also, equal rates were maintained from all three wells. All other runs conditions were maintained substantially constant in the various runs.

*Areal sweep efficiency (percent)*

| Run No. | B.T. | 2.0 P.V. |
| --- | --- | --- |
| 216 | 53 | 91 |
| 217 | 53 | 89 |
| 218 | 49 | 88 |
| 219 | 32 | 91 |
| 220 | 36 | 81 |

The data in the above table are for a mobility ratio of 10. Mobility ratio is defined as $$M.R. = \frac{\text{mobility } (K/\mu) \text{ of displacing fluid}}{\text{mobility } (K/\mu) \text{ of displaced fluid}}$$

where: $K$ = permeability in md. (millidrocys)
$\mu$ = viscosity in cps.

Since the process is miscible flood, the $K$ values are equal and so $$\text{Mobility ratio} = \frac{\text{(viscosity) of displaced fluid}}{\text{(viscosity) of displaced fluid}} = \frac{10}{1} = 10$$

The liquid used for saturating the pore volume or sand in the tests was made by mixing glycerin with water. The displacing liquid was prepared by mixing a dye with water to obtain the viscosities set forth (9.3 cps. and 0.93 cps.). Thus the mobility ratio of a displaced fluid to the displacing fluid was 10.

From the literature it is determined that, for the mobility ratio of 10, the areal swep efficiency is 38% at break thru and after injecting 2 P.V., the areal sweep efficiency is found to be 81% when utilizing conventional flow in a five-spot well pattern. The data in the table demonstrate the higher areal sweep efficiency for break thru in runs 216, 217, and 218 and also high sweep efficiency at the end of 2.0 pore volumes of injected fluid for all the runs excepting Run No. 220. The areal sweep efficiency of a flood of fluid displacement for the recovery of oil is increased both at and after break thru of displacing fluid by injecting at two diagonally opposed wells, and adjusting the production rates at the center well and the other two diagonal wells so as to permit break thru at all three wells substantially simultaneously. The present invention shows its greatest improvement over the art when the mobility ratio is greater than unity, i.e., when the displacing fluid has lower viscosity than the fluid being displaced.

In practice, various displacing fluids have been utilized. The most common comprises steam or water to which may be added various soluble materials in minor amounts. Normally gaseous hydrocarbons are also injected under high pressure so that the hydrocarbons go into solution in the oil, thereby reducing the viscosity and surface tension of the oil as well as increasing its volume. This amounts to a miscible fluid drive because the light hydrocarbons are miscible in the oil. Because of the cost of these hydrocarbons, the practice of injecting a certain percent of the pore volume of the formation to be flooded and following this with a cheaper fluid, such as air or water, is followed. Another method comprises injecting liquid hydrocarbons of lower viscosity than the crude oil to be produced and driving the liquid hydrocarbon thru the formation with a cheaper driving fluid. Some methods utilize alternate slugs of miscible fluid and driving fluid such as propane and gas such as natural gas, air, $CO_2$, etc., which can be followed by water or steam.

It is advantageous to keep the miscible displacing fluid in the formation as long as possible and therefore this displacing fluid should not be produced thru any one of the boreholes until break thru at each of the boreholes is approached or arrived at. If break thru of displacing fluid is sensed at any of the producing wells, such well should be closed until break thru at the other wells is sensed or is imminent. This preserves the miscible displacing fluid in the formation until the maximum sweep of the formation has been effected with the given well pattern.

In accordance with another embodiment of the invention, when most of the oil is produced from the selected pattern, or when the driving fluid has passed into most of the reservoir within the well pattern, production of oil thru the central well is discontinued and driving fluid is injected thru this well while continuing the injection of driving fluid thru the original injection wells. To illustrate with reference to FIGURE 1, injection thru wells 12 and 14 is continued with controlled back pressure and production thru wells 10, 16, and 18 until most of the square pattern has been occupied by the driving fluid. The stage of production illustrated in FIGURE 1 is a good time to shift well 10 to an injection well. At the selected time, production thru well 10 is terminated and driving fluid is injected thru this well while continuing the injection of the driving fluid thru wells 12 and 14 so as to force remaining oil to wells 16 and 18 thru which the oil is produced. The same procedures are applicable to any well pattern having an even number (at least 4) of wells surrounding the central well such as in a 7 or 9-spot pattern.

By this procedure of converting central well 10 to an injection well after the driving fluid has passed thru most of the pattern, the driving fluid can be forced thru the entire well pattern, thereby producing a greater proportion of the oil in the reservoir pattern than can be produced without this technique. Actually, it is impossible to force the driving fluid along the boundaries of the pattern by merely injecting driving fluid thru wells 12 and 14. However, by injecting thru central well 10, the driving fluid can be forced thru the reservoir substantially along the boundary lines of the pattern. This is highly significant in view of the fact that it is economically desirable to produce as much as possible of the reservoir covered by the well pattern.

The method of the invention is also applicable to production by in situ combustion utilizing direct drive of a combustion front thru the well pattern. In applying the technique of the invention to a well pattern having an even number of wells in the ring, the stratum is ignited around alternate wells in the ring and combustion supporting air is injected thru these ignition wells and produced gases are recovered from the central well and the other wells in the ring as producing wells. When the combustion zone arrives at the central well, this well is converted to an injection well as in other fluid drive techniques. Also, injection thru the original injection wells in the ring may be continued, cut back, or these wells may be shut-in. Injection thru the central well is continued until the narrow areas between the central well and the producing wells in the ring have been traversed by the combustion front.

Certain modifications of the invention will become apparent to those skilled in the art and the illustrative details disclosed are not to be construed as imposing unnecessary limitations on the invention.

I claim:

1. The method for producing an oil-bearing subterranean stratum by fluid drive displacement using a well pattern including a central well and an even number of at least 4 surrounding wells in a conventional odd-numbered-spot pattern, which comprises injecting driving fluid through alternate surrounding wells and producing the driven oil through said central well and through the remaining surrounding wells as producing wells; maintaining back pressure on the production wells; controlling the back pressure on said producing wells so as to effect breakthrough (production of displacing fluid) at the producing wells substantially at the same time; and continuing injection of said fluid through said injection wells until breakthrough at all of said producing wells occurs.

2. The method of claim 1 wherein said fluid comprises liquid phase.

3. The method of claim 1 wherein said fluid comprises gas phase.

4. The method of claim 1 wherein said fluid comprises water.

5. The method of claim 1 wherein said fluid comprises hydrocarbon.

6. The method of claim 1 wherein said fluid comprises normally gaseous hydrocarbon.

7. The method of claim 1 wherein said pattern is a 5-spot pattern.

8. The method of claim 1 wherein said pattern is a 7-spot pattern.

9. The method of claim 1 wherein said pattern is a 9-spot pattern.

10. The method of claim 1 wherein as breakthrough at each production well is sensed and each well except the last to experience breakthrough is closed to production until breakthrough occurs at said last well and production is thereafter continued by injecting driving fluid through said central well and producing only through the other production wells.

11. The method of claim 10 wherein injection through the surrounding injection wells is continued during injection through said central well.

12. The process of claim 11 wherein continued injection through the surrounding injection wells is at a reduced rate compared with the injection rate before injection through said central well is initiated.

13. The method of claim 10 wherein the surrounding injection wells are closed in during injection through said central well.

14. The method for producing an oil-bearing subterranean stratum by fluid drive displacement using a well pattern including a central well and an even number of surrounding wells of at least 4 substantially uniformly spaced from each other and from said central well, which comprises injecting driving fluid thru alternate surrounding wells and producting the driven oil thru said central well and thru the remaining surrounding wells until the driving fluid has passed into most of said well pattern; thereafter terminating production thru said central well injecting driving fluid thru said central well; and continuing production thru said remaining surrounding wells while injecting driving fluid thru said central well and preventing producing thru said alternate wells.

15. The process of claim 14 wherein injection thru said alternate surrounding wells is continued during injection thru said central well.

16. The method for producing an oil-bearing subterranean stratum by fluid drive displacement using a well pattern including a central well and an even number of at least 4 surrounding wells in a substantially symmetrical spot pattern, which comprises injecting driving fluid thru alternate surrounding wells and producing the driven oil thru said central well and thru the remaining surrounding wells as producing wells until the driving fluid has reached each of the production wells; thereafter under the condition resulting from the preceding steps, terminating production thus said central well and injecting driving fluid thru said central well; and continuing production only thru the remaining production wells while injecting driving fluid thru said central well.

References Cited by the Examiner

UNITED STATES PATENTS 1,826,371 10/31 Spindler _____ 166—10
2,885,002 5/59 Jenks _____ 166—9

OTHER REFERENCES

Fagin, K. M.: Effect of Well Spacing on Water Flood Operations and Economics, in The Petroleum Engineer. pp. 64, 66, 68, 70, 72; 6/46.

Heath, W. A., et al.: Secondary Recovery in Oklahoma. In Secondary Recovery of Oil in the United States, American Petroleum Institute 1950, pg. 549. TN 871A5 1950.

CHARLES E. O'CONNELL, *Primary Examiner.*

BENJAMIN HERSH, *Examiner.*

UNITED STATES PATENT OFFICE
CERTIFICATE OF CORRECTION

Patent No. 3,199,587

August 10, 1965

Melcon Santourian

It is hereby certified that error appears in the above numbered patent requiring correction and that the said Letters Patent should read as corrected below.

Column 6, line 24, for "producting" read -- producing --; line 45, for "thus" read -- thru --.

Signed and sealed this 29th day of March 1966.

(SEAL)
Attest:

ERNEST W. SWIDER
Attesting Officer

EDWARD J. BRENNER
Commissioner of Patents